US009860027B2

(12) United States Patent
Christoffersson et al.

(10) Patent No.: US 9,860,027 B2
(45) Date of Patent: Jan. 2, 2018

(54) METHOD FOR SHARING RESOURCES USING INDIVIDUAL HARQ PROCESSES (71) Applicant: Telefonaktiebolaget L M Ericsson (publ), Stockholm (SE)

(72) Inventors: Jan Christoffersson, Luleå (SE); Min Wang, Luleå (SE); Niklas Johansson, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/785,371

(22) PCT Filed: May 21, 2013

(86) PCT No.: PCT/SE2013/050571
§ 371 (c)(1),
(2) Date: Oct. 19, 2015

(87) PCT Pub. No.: WO2014/189416
PCT Pub. Date: Nov. 27, 2014

(65) Prior Publication Data
US 2016/0080117 A1    Mar. 17, 2016

(51) Int. Cl.
*H04L 15/00* (2006.01)
*H04L 1/18* (2006.01)
*H04W 74/08* (2009.01)

(52) U.S. Cl.
CPC .......... *H04L 1/1893* (2013.01); *H04L 1/1822* (2013.01); *H04L 1/1887* (2013.01); *H04W 74/0816* (2013.01)

(58) Field of Classification Search
None
See application file for complete search history.

(56) References Cited

U.S. PATENT DOCUMENTS

2008/0077837 A1\* 3/2008 Lohr ............... H04L 1/0006
714/748
2009/0109912 A1\* 4/2009 DiGirolamo ....... H04L 5/0053
370/329
(Continued)

FOREIGN PATENT DOCUMENTS

WO    2009045840 A2    4/2009
WO    2013023835 A1    2/2013

OTHER PUBLICATIONS

Author Unknown, "Technical Specification Group Radio Access Network; Medium Access Control (MAC) protocol specification (Release 10)," Technical Specification 25.321, Version 10.3.0, 3GPP Organizational Partners, Jun. 2011, 198 pages.
(Continued)

*Primary Examiner* — Brandon Renner
(74) *Attorney, Agent, or Firm* — Withrow & Terranova, PLLC (57) ABSTRACT The network node of a cellular network assigns a first part of a shared radio resource to a first User Equipment, UE, for uplink transmissions in the cell, and instructs the first UE to apply a first UE-specific Hybrid Automatic Repeat Request, HARQ, process for transmitting on the assigned first part. The network node also assigns a second part of the shared radio resource to a second UE for uplink transmissions in the cell, and instructs the second UE to apply a second UE-specific HARQ process for transmitting on the assigned second part, the second HARQ process being separate from the first HARQ process. The network node then receives data transmitted from the first UE on the assigned first part based on the first HARQ process and data transmitted from the second UE on the assigned second part based on the second HARQ process.

22 Claims, 5 Drawing Sheets (56) References Cited

U.S. PATENT DOCUMENTS

| | | | | |
|---|---|---|---|---|
| 2009/0135771 | A1* | 5/2009 | Pani | H04W 72/042 370/329 |
| 2009/0163199 | A1* | 6/2009 | Kazmi | H04L 1/0026 455/425 |
| 2009/0225709 | A1* | 9/2009 | Wager | H04W 72/0413 370/329 |
| 2010/0111023 | A1* | 5/2010 | Pelletier | H04L 5/0007 370/329 |
| 2010/0188969 | A1* | 7/2010 | Kim | H04W 72/1284 370/216 |
| 2012/0003977 | A1* | 1/2012 | Iwamura | H04W 36/0033 455/436 |
| 2012/0071186 | A1* | 3/2012 | He | H04W 52/325 455/509 |
| 2012/0147859 | A1* | 6/2012 | He | H04W 52/50 370/336 |
| 2012/0176951 | A1* | 7/2012 | Pradas | H04W 74/08 370/312 |
| 2013/0028219 | A1* | 1/2013 | Lee | H04W 74/006 370/329 |
| 2014/0307668 | A1* | 10/2014 | Shao | H04W 74/08 370/329 |
| 2014/0355573 | A1* | 12/2014 | Wong | H04W 72/0446 370/336 |

OTHER PUBLICATIONS

Author Unknown, "Technical Specification Group Radio Access Network; Radio Resource Control (RRC); Protocol specification (Release 10)," Technical Specification 25.331, Version 10.4.0, 3GPP Organizational Partners, Jun. 2011, 1,879 pages.

Huawei, et al., "R2-122299: Discussion on Sub-feature Dependency and Signature Partition," 3rd Generation Partnership Project (3GPP), TSG-RAN WG2 #78, May 21-25, 2012, 4 pages, Prague, CZ.

Intel Corporation, "Tdoc R2-114078: Considerations to the support of Per-HARQ process grants," 3rd Generation Partnership Project (3GPP), TSG-RAN WG2 Meeting #75, Aug. 22-26, 2011, 4 pages, Athens, Greece.

International Search Report and Written Opinion for International Patent Application No. PCT/SE2013/050571, dated Mar. 17, 2014, 13 pages.

Examination Report for European Patent Application No. 13885444.3, dated Nov. 2, 2017, 5 pages.

* cited by examiner

METHOD FOR SHARING RESOURCES USING INDIVIDUAL HARQ PROCESSES

This application is a 35 U.S.C. §371 national phase filing of International Application No. PCT/SE2013/050571, filed May 21, 2013, the disclosure of which is incorporated herein by reference in its entirety.

TECHNICAL FIELD

The present disclosure relates generally to a network node, a User Equipment, UE and methods therein for handling radio resources for radio communication in a cellular network.

BACKGROUND

For some years, different types of cellular networks for wireless communication have been developed to provide radio access for various wireless terminals in different areas. The cellular networks are constantly improved to provide better coverage and capacity to meet the demands from subscribers using services and increasingly advanced terminals, e.g. smartphones and tablets, which may require considerable amounts of bandwidth and resources for data transport in the networks. A limiting factor for capacity of cellular networks is the amount of available radio resources, e.g. defined by a combination of time, frequency and/or code depending on the access technology used, and the capacity of a network may be improved by more efficient usage of such radio resources.

In this disclosure, the term "User Equipment, UE" is used to represent any user-controlled wireless terminal or device capable of radio communication including receiving downlink signals transmitted from a radio node of a cellular network. Without limitation, the UE may be a non-stationary device operated by a user or an automatically operating device sometimes referred to as a Machine-to-Machine (M2M) device. Further, the term "network node", represents any node of a cellular network that can communicate uplink and downlink radio signals with UEs. The network node in this description may also be referred to as a base station, NodeB, e-nodeB, eNB, base transceiver station, etc.

In the Third Generation Partnership Project, 3GPP, two different states of Radio Resource Control, RRC, have been defined for UEs communicating data, referred to as the "CELL_FACH" state where FACH=Forward Access Channel, and the "CELL_DCH" state where DCH=Dedicated Channel. Of these two states the CELL_FACH state involves communication on the FACH which is a common channel with radio resources that can be shared by multiple UEs, while the CELL_DCH state involves communication on dedicated channels with radio resources being exclusively reserved and occupied by each UE until its session ends.

In the CELL_FACH state, each UE needs to perform a random access procedure to obtain some of the shared radio resources for uplink communication. The radio resources used for UEs in the CELL_DCH state may easily become congested in a cell since relatively large data amounts are communicated with each UE in this state, e.g. due to high load. On the other hand, the radio resources available in the CELL_FACH state are typically occupied briefly for transitory and sporadic transmissions when very small data amounts are communicated with each UE.

A UE with such "small" transmissions may still need to be constantly connected, e.g. when its uplink transmissions are quite frequent such as in so-called "always on" services. In that case, the UE would get better performance in the CELL_DCH state by not having to perform the random access process every time it has data to send which saves time and signaling, and also because this state supports a fast power control. However, precious radio resources may then be occupied over lengthy periods for the UE also when the UE has no data to send, which may contribute to congestion when the traffic is dense in the cell. Therefore, the UE is typically put in the CELL_FACH state instead to avoid congestion and reduced capacity in the cell.

In Release 8 of 3GPP, a concept called common Enhanced Dedicated Channel, E-DCH, was introduced which basically denotes a pool of shared radio resources that can be used temporarily by UEs in the CELL_FACH state when data is transmitted "sporadically" and in small packets from each UE. Such traffic of small data amounts may be identified as a "chatty" type of traffic or a machine type of traffic. The common E-DCH is used to move UEs with small data amounts to send from the CELL_DCH state to the CELL_FACH state. The common E-DCH resources may also be used by UEs in idle state.

It is deemed more efficient for the network to utilize such common E-DCH resources in the CELL_FACH state for "small" transmissions than to occupy CELL_DCH resources, at least in situations with dense traffic, thus offloading the congestion-sensitive CELL_DCH resources and utilizing better the potential capacity of the CELL_FACH resources. Further, the transmissions over common E-DCH resources allow for applying a higher order of modulation and/or a Hybrid Automatic Repeat Request, HARQ, process involving acknowledgment or non-acknowledgment of properly decoded data, which both can ensure efficient communication of data and increase uplink data throughput in the CELL_FACH state significantly. The usage of common E-DCH resources in a cell may be managed by a base station serving the cell which also regularly broadcasts configuration information of the common E-DCH resources to any UEs present in the cell.

A UE can obtain a common E-DCH resource in the CELL_FACH state by sending a randomly selected code and preamble signature on a channel called Physical Random Access Channel, PRACH. The base station then returns an acknowledgement of an allocated resource over a channel called Acquisition Indicator Channel, AICH. In this disclosure, the term "signature" will be used for short to represent any codes, preamble signatures or similar parameters that can be selected by UEs and used in a random access procedure in the manner described, e.g. on the PRACH.

Since there is only a limited number of such signatures available to UEs in a cell, there is a risk, particularly during high load, that two or more UEs in the cell happen to randomly select the same signature. In that case, it is not possible for the network to uniquely identify each UE by means of their randomly selected signatures and a collision may thus occur between two or more UEs since the network would allocate and acknowledge the same common E-DCH resource to these UEs.

To avoid a collision when multiple UEs access the network with the same signature, a collision resolution period has been introduced during which the UEs transmit Media Access Control, MAC, packets with a unique UE identifier called E-DCH Radio Network Temporary Identifier, E-RNTI, attached in the MAC header of each packet. Upon reception of these MAC packets, the network will assign a granted common E-DCH resource to the E-RNTI of one of the UEs and this assignment is signaled over a channel called E-DCH Absolute Grant Channel, E-AGCH. The granted resource may be signaled with an E-RNTI specific Cyclic Redundancy Check, CRC, attached which the UE is able to recognize. The other UEs that did not get the granted resource over E-AGCH will therefore terminate their data transmissions once the collision resolution period expires and try again later with a new random access attempt.

An E-DCH session for a "burst-like" data transmission from a UE in the CELL_FACH state would typically be short. The allocated common E-DCH resource will be released after the session ends to become available for other UEs in the CELL_FACH state. The next data transmission from the UE would require the UE to perform the above-described PRACH access with another randomly selected signature, which is completed after expiry of another collision resolution period.

As explained above, the limited number of signatures available in a cell may be a bottleneck for uplink transmissions in the CELL_FACH state since this scheme only allows a limited number of UE sessions to be active at the same time. In case of dense traffic in the cell, some UEs not getting a common E-DCH resource will have to wait for ongoing sessions to be released before starting a session. It is therefore desirable to release a session no later than necessary. On the other hand, it is more efficient to maintain a session for UEs that frequently send short bursts of data thus saving the time and signaling involved in the PRACH random access procedure.

Various schemes for dividing the available signatures into different partitions with respect to different UE capabilities and features, have been proposed where different subsets of the signatures are reserved for different partitions. In this way, it is possible to handle the UEs within each partition uniformly in terms of the random access process and assignment of radio resources. However, it is a problem that a blocking situation may occur when all available radio resources are occupied by a number of UEs in the cell such that no further UEs are able to obtain a radio resource for transmitting uplink data. Such a blocking situation may also occur within one or more of the above-mentioned partitions if there are currently too many UEs in the cell that match a certain partition in relation to the number of signatures reserved for that partition.

SUMMARY

It is an object of embodiments described herein to address at least some of the problems and issues outlined above. It is possible to achieve this object and others by using a network node, a User Equipment, UE, and methods therein as defined in the attached independent claims.

According to one aspect, a method is provided in a network node of a network for wireless communication, for managing radio resources in a cell served by the network node. In this method, the network node assigns a first part of a shared radio resource to a first UE for uplink transmissions in the cell, and instructs the first UE to apply a first UE-specific Hybrid Automatic Repeat Request, HARQ, process for transmitting on the assigned first part. The network node further receives data transmitted from the first UE on the assigned first part, based on the first HARQ process.

The network node also assigns a second part of a shared radio resource to a second UE for uplink transmissions in the cell, and instructs the second UE to apply a second UE-specific HARQ process for transmitting on the assigned second part, wherein the second HARQ process is separate from the first HARQ process. The network node further receives data transmitted from the second UE on the assigned second part based on the second HARQ process.

According to another aspect, a network node of a network for wireless communication is configured to manage radio resources in a cell served by the network node. The network node comprises an assigning unit which is adapted to assign a first part of a shared radio resource to a first User Equipment, UE, for uplink transmissions in the cell, and an instructing unit which is adapted to instruct the first UE to apply a first HARQ process for transmitting on the assigned first part. The network node also comprises a receiving unit which is adapted to receive data transmitted from the first UE, based on the first HARQ process.

In the network node, the assigning unit is further adapted to assign a second part of the shared radio resource to a second UE for uplink transmissions in the cell, the instructing unit is further adapted to instruct the second UE to apply a second HARQ process for transmitting on the assigned second part, and the receiving unit is further adapted to receive data transmitted from the second UE based on the second HARQ process. Thereby, the two UEs can share the same radio resource simultaneously without collision by using different HARQ processes. It should be noted that the above method and network node are not limited to managing radio resources for just two UEs as described above, and any number of UEs may be served in this way on a shared radio resource as long as there are enough radio resources available in the cell, which thus provides for scalability and flexibility.

According to another aspect, a method is provided in a first User Equipment, UE, for accessing a radio resource when the first UE is present in a cell served by a network node of a network for wireless communication. In this method, upon sending a request for a shared radio resource to the network node, the UE receives an instruction from the network node to apply a first HARQ process for transmitting on an assigned first part of the shared radio resource. the UE then transmits data on the assigned first part according to the first HARQ process.

According to yet another aspect, a first UE is adapted to access a radio resource when the first UE is present in a cell served by a network node of a network for wireless communication. The UE comprises a requesting unit adapted to send a request for a shared radio resource to the network node, and a receiving unit adapted to receive an instruction from the network node to apply a first Hybrid Automatic Repeat Request, HARQ, process for transmitting on an assigned first part of the shared radio resource. The UE also comprises a transmitting unit adapted to transmit data on the assigned first part according to the first HARQ process.

The above methods and nodes may be configured and implemented according to different optional embodiments to accomplish further features and benefits, to be described below.

BRIEF DESCRIPTION OF DRAWINGS

The solution will now be described in more detail by means of exemplifying embodiments and with reference to the accompanying drawings, in which.

DETAILED DESCRIPTION

Briefly described, a solution is provided to enable efficient utilization of radio resources available to multiple UEs for uplink transmissions in a cell. This may be achieved by assigning different parts of a shared radio resource to different UEs for uplink transmissions in the cell, and by instructing the UEs to apply different Hybrid Automatic Repeat Request, HARQ, processes for transmitting on their respective assigned parts. Thereby, more than one UE can utilize the same shared radio resource simultaneously without collision since the HARQ processes require the UEs to make their uplink transmissions in HARQ-specific time intervals determined by the respective HARQ processes.

This solution thus makes it possible to utilize a shared radio resource more efficiently by letting multiple UEs take turns to use the shared radio resource on their respective parts of the resource, i.e. during the separate HARQ-specific time intervals, instead of having to wait for one UE to use and release the common resource before another UE can start using it as in the known procedure. A HARQ process generally requires a node receiving data from another node to inform whether a transmitted chunk of data has been properly received and decoded or not by sending an ACK or a NACK to the data transmitting node. When receiving a NACK, the data transmitting node is required to retransmit the same chunk of data. The HARQ process is widely known as such in this field and is not necessary to describe in any further detail to understand the embodiments of this solution described below. In this solution, the UE is thus the data transmitting node and the network node is the data receiving node.

It was mentioned above that the limited amount of available signatures may be divided into different partitions defined by different UE capabilities and features. The signatures in each partition are thus made available for use only by UEs having the capabilities and features associated with that partition when requesting for a radio resource, such as the above-described common E-DCH resource. In the solution described below, a specific partition may be formed for the shared radio resource having a specific signature reserved for that partition.

Figure 1:
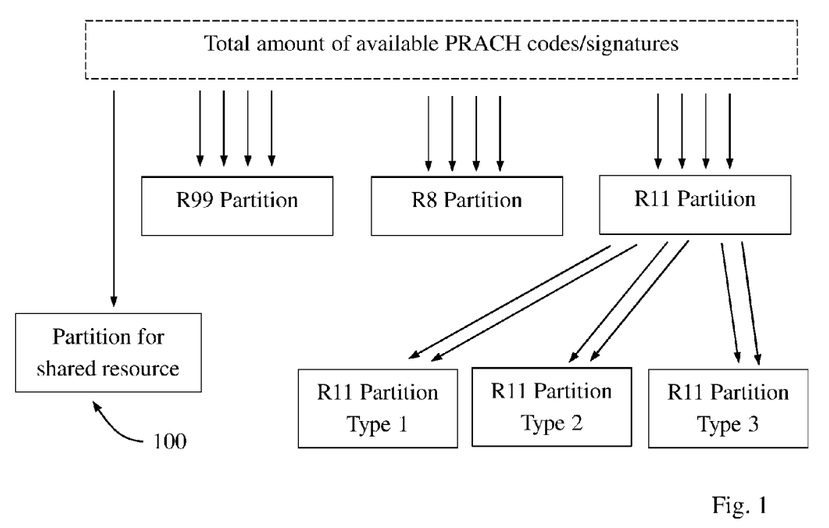
FIG. 1 is a schematic diagram illustrating how signatures may be divided into partitions, according to the prior art.

FIG. 1 illustrates schematically an example where the total amount of available signatures has been distributed and divided into different partitions, as shown by the arrows, depending on features defined in different 3GPP releases. Firstly, the signatures are divided into three partitions: a partition suitable for UEs with capabilities for features up to Release 99, denoted "R99", a partition suitable for UEs with capabilities for features up to Release 8, denoted "R8", and a partition suitable for UEs with capabilities for features up to Release 11, denoted "R11". The latter partition of Release 11 may be further divided into three sub-partitions based on "sub-features" that have been introduced in 3GPP Release 11 for UEs in the CELL_FACH state. These sub-partitions of the R11 partition are denoted Type 1, 2 and 3, respectively, and can be used for random access exclusively by UEs having the respective sub-features implemented, thus providing five different partitions in total.

For example if the above partitions are used, the limited number of signatures may be insufficient for one partition resulting in high blocking probability while there may be an excessive number of signatures available for another partition, depending on the current load situation in the cell within the different partitions. It is thus difficult to make an optimal distribution of signatures over the different partitions and one distribution over partitions may be optimal or "well-tuned" in one scenario but not in another scenario. Furthermore, the distribution of signatures cannot easily be changed on a dynamic basis for different load situations due to limitations in the signaling overhead required to signal the distribution change to the UEs. These problems may be alleviated as follows.

When implementing the solution, e.g. according to any of the embodiments described herein, a new partition may be added to the above scheme of five partitions such that the new partition contains at least one signature reserved for UEs that access the shared radio resource to make uplink transmissions. Thus, in the above partition scheme, a sixth partition 100 may be added with a signature associated with the shared radio resource. This signature can thereby be used by two or more UEs to get respective parts of the shared radio resource in a manner to be described below. Although the following embodiments are described in terms of a single partition for the shared radio resource, the solution is not limited thereto and more than one signature may also be used which are associated with and point to the shared radio resource.

Figure 2:
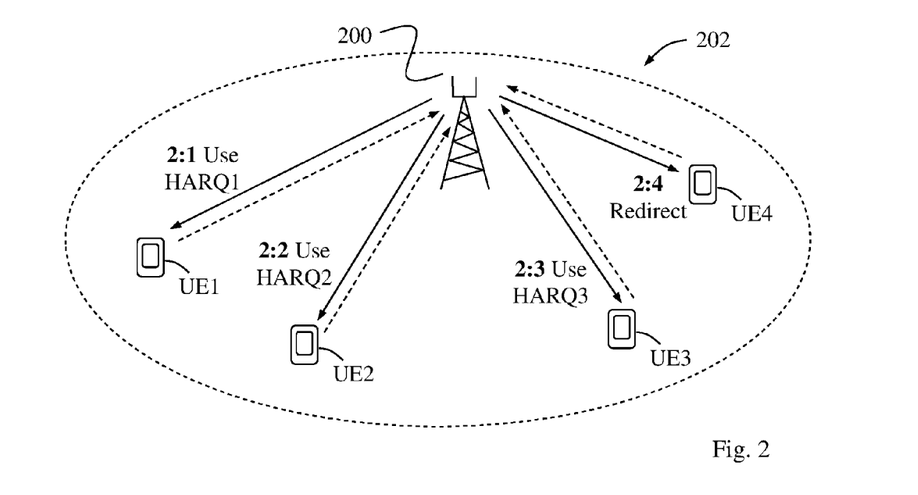
FIG. 2 is a communication scenario illustrating a network node in operation when connected to multiple UEs, according to some possible embodiments.

FIG. 2 illustrates a scenario where a network node 200, such as a base station or the like, serves a cell 202 where four UEs, UE1-UE4, are present. The network node 200 regularly broadcasts various system information that includes a range of signatures that can be used by UEs in the above-described random access procedure to obtain a radio resource for uplink transmissions. In this example, a shared radio resource is identified by a specific signature that the UEs 1-4 include in respective resource requests to the network node 200, as indicated by the dashed uplink arrows. The network node 200 have thus broadcasted the specific signature in the system information which the UEs can read and eventually use in the random access procedure when it has data to transmit. It should be noted that the resource requests from UEs 1-4 are made individually whenever the UEs have data to transmit and the network node 200 may assign different parts of the shared radio resource individually and at different time points to all or some of the UEs 1-4 as follows.

In response to the resource requests received from the UEs 1-4, dashed arrows, the network node 200 assigns different parts of the shared radio resource to UEs 1, 2 and 3, respectively, but not to UE4, e.g. because all available parts of the shared resource have already been occupied by UEs 1, 2 and 3 and possibly by further UEs, not shown. As shown in the figure in more detail, the network node 200 instructs UE1 to apply a first HARQ process "HARQ1" for transmitting on the assigned first part, in a shown action 2:1. Further, the network node 200 instructs UE2 to apply a second HARQ process "HARQ2" for transmitting on the assigned second part, in another action 2:2, and instructs UE3 to apply a third HARQ process "HARQ3" for transmitting on the assigned third part of the shared radio resource, in an action 2:3.

However, as mentioned above there is no part of the shared radio resource left for UE4 to use, and the network node 200 may therefore send a redirect message or the like to UE4 in response to UE4's resource request, in an action 2:4. The redirect message may tell the UE4 to make a new access request using another signature which may identify and point to a radio resource other than the shared radio resource, e.g. a radio resource associated with any of the above-described partitions for R99, R8, R11 and so forth. In this way, the UEs 1, 2 and 3 can transmit data on the shared radio resource by applying the respective HARQ processes HARQ1, HARQ2 and HARQ3, without colliding. Some examples of how this can be done in more detail when two UEs are involved will be described later e.g. with reference to the illustrations in FIGS. 4 and 8.

Figure 3:
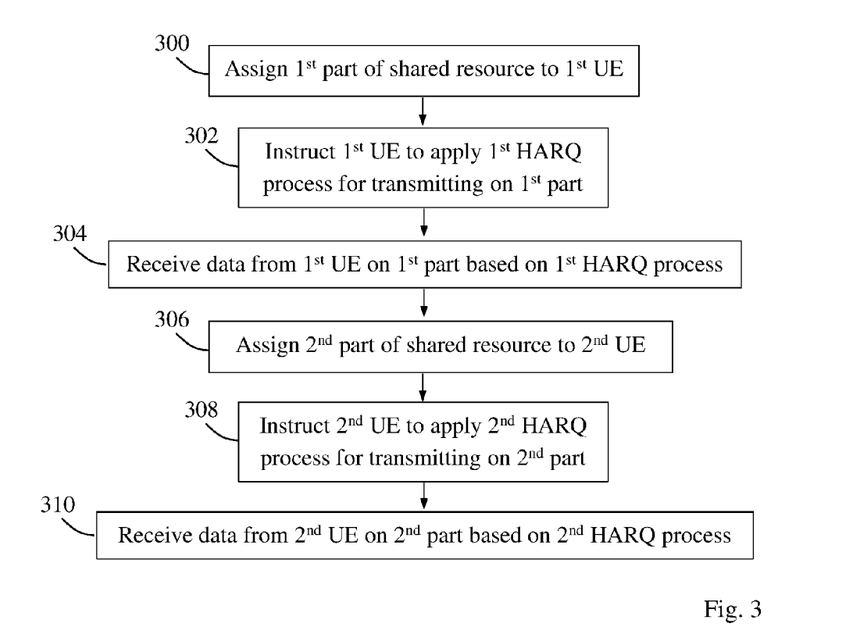
FIG. 3 is a flow chart illustrating a procedure in a network node, according to further possible embodiments.

A procedure with actions performed by a network node of a network for wireless communication, for managing radio resources in a cell served by the network node, will now be described with reference to the flow chart in FIG. 3. It is assumed that there are at least two UEs present in the cell, referred to as a first UE and a second UE. Further, each of the first and second UEs request for a radio resource by sending a resource request to the network node. According to regular behavior, a resource request may be triggered in the UEs when there is data to transmit in each respective UE, which data is typically gathered in a data buffer in the UE.

As explained above, a shared radio resource may be identified by a specific signature that the UEs can include in their resource requests to indicate that they are prepared to use a part of the shared radio resource. The individual UEs may have taken a decision to select the shared radio resource even though there may be some constraints when using the shared radio resource, such as e.g. limited throughput or bitrate of data, a maximum allowed total time span of usage by a UE, and a maximum allowed amount of data that can be transmitted by a UE, and so forth. This type of constraint information and other information regarding the shared radio resource may be broadcasted as system information in the cell, which will be further described later below. The decision to select the shared radio resource may depend on what kind of data is to be transmitted and/or which service or service class is used, and so forth, which is however somewhat outside the scope of this solution.

In a first shown action 300, e.g. upon receiving a resource request from the first UE, the network node assigns a first part of the shared radio resource to the first UE for uplink transmissions in the cell. A next action 302 illustrates that the network node instructs the first UE to apply a first UE-specific Hybrid Automatic Repeat Request, HARQ, process for transmitting on the assigned first part. In this context, the term "UE-specific" HARQ process means that the HARQ process is allocated for exclusive use by a particular UE, i.e. the first UE in this case. Further, the first UE-specific HARQ process is closely associated with the first part of the shared radio resource, as will be explained in more detail later below. In a following action 304, the network node receives data transmitted from the first UE on the assigned first part based on the first HARQ process.

The above procedure of actions 300-304 is basically performed for the second UE as well, as follows. Thus in a further action 306, e.g. upon receiving a resource request from the second UE, the network node assigns a second part of the shared radio resource to the second UE for uplink transmissions in the cell. A next action 308 illustrates that the network node instructs the second UE to apply a second UE-specific HARQ process for transmitting on the assigned second part. Finally, an action 310 illustrates that the network node receives data transmitted from the second UE on the assigned second part based on the second HARQ process. It should be noted that the two processes of actions 300-304 and actions 306-310 are performed more or less independent from each other and may be performed one after the other or more or less at the same time.

The above-described procedures may be implemented according to various optional and non-limiting embodiments. For example, the first and second UEs may be in the above-described CELL_FACH state and the shared radio resource may be the above-described common E-DCH resource. Thereby, UEs having small amounts of data to transmit occasionally over longer periods may be put in the CELL_FACH state and be able to transmit only occasionally without losing the resource, instead of occupying resources in the CELL_DCH state which otherwise might cause congestion.

In other possible embodiments, the shared radio resource may be, as mentioned above, identified by a specific signature that has been assigned to the shared radio resource. In this case, the specific signature is included in a resource request received from each of the first and second UEs when the first and second UEs request for a radio resource. A potential advantage of these embodiments is that the UE is allowed to decide whether to request for the shared radio resource by means of the specific signature or not. The shared radio resource also offers enhanced flexibility since more than one UE can access and use the resource simultaneously by means of the same specific signature.

The specific signature may be included in system information signaled in the cell from the network node. As mentioned above, the system information may further include other information about the shared radio resource such as various constraints of using the shared radio resource. It is an advantage that this information may provide a useful basis for UEs when deciding whether or not to request for the shared radio resource. The system information may thus comprise at least one of the following:

A) A maximum number of UEs supported by the shared radio resource. This information provides an indication of the capacity and performance of the shared radio resource and may be dependent on how much bandwidth is reserved for the shared radio resource in the cell.

B) Length of an inactivity timer determining when an assigned part of the shared radio resource will be released after last data transmission which could be either uplink or downlink. The inactivity timer thus indicates how long the UE can be "silent", i.e. not transmitting or receiving, without losing the resource.

C) UE capabilities required for using the shared radio resource. For example, the UE may be required to use a particular modulation and/or coding scheme, e.g. to handle a HARQ process.

D) A potential throughput of data that can be achieved by using the shared radio resource. This information may be used by the UE to decide if the bitrate requirements of a particular service can be met when using the shared radio resource.

E) A default HARQ process to be applied initially during a collision resolution period. In more detail, there is a possibility that two or more UEs sends requests for the shared radio resource more or less at the same time using the same signature identifying the shared radio resource. As mentioned above, a process is known as such for handling a collision situation when multiple UEs access the network with the same signature. During the collision resolution period, the UEs transmit a unique UE identifier, e.g. the E-RNTI, which may be attached in a MAC header as described above. In this embodiment, the UEs are enabled to apply the default HARQ process for transmitting their UE identifiers to the network node during a collision resolution period. In response thereto, the network will be able to assign different parts of the shared radio resource and different corresponding UE-specific HARQ processes to the UEs, which information is signaled to the respective UEs, e.g. over the E-AGCH, using their UE identifiers. Thereby, it is possible to allow two or more UEs to use the same shared resource even in the case when their initial resource requests collide.

F) A maximum allowed time span of using the shared radio resource, which may be used by the UE to decide if the expected duration of a particular service can be met when using the shared radio resource.

G) A maximum amount of data allowed for transmission on the shared radio resource, which may be used by the UE to decide if the expected data amount of a particular service can be met when using the shared radio resource.

In this solution, it is possible to allocate more than one HARQ process to a single UE. Thus, the expression "a HARQ process" in this disclosure is non-limiting and should be understood as at least one HARQ process. Thus in another possible embodiment, the first UE may be initially instructed to apply a set of UE-specific HARQ processes for transmitting. A potential advantage of this embodiment is that the UE can be given more bandwidth and higher data throughput by adding one or more further HARQ processes. On the other hand, if the shared resource is fully occupied by one or more UEs and a resource request is received from yet another UE, it is possible in this solution to ask a UE with multiple HARQ processes to decrease the number of used HARQ processes. Thus, the first UE may in that case be re-instructed to release at least one of the set of UE-specific HARQ processes to make the released at least one HARQ process available to one or more other UEs in the cell.

In yet another possible embodiment, the procedure according to this solution, e.g. as described for FIG. 3 above, may be performed when a current traffic load in the cell exceeds a threshold or when the number of available signatures is below a limit. A potential advantage of this embodiment is that the procedure will not be performed when not really needed, such as when there are ample amounts of unoccupied radio resources available to one or more UEs in the cell, or when the number of available signatures is sufficient to create enough partitions for distributing the UEs into smaller groups that are not congested.

In another possible embodiment, the first part of the shared radio resource assigned to the first UE may be released after an inactivity timer has expired indicating a timeout of empty data buffer in the first UE. This inactivity timer may be implemented in the UE or in the network node as follows. In the former case, the UE starts the inactivity timer each time its data buffer becomes empty, that is when all data in the buffer has been transmitted and no further data has been generated in the UE. The inactivity timer is stopped as soon as new generated data enters the buffer. If the inactivity timer expires without any new data in the buffer, the UE initiates a release process by sending a message to the network node indicating that the data buffer has remained empty for a specific time according to the inactivity timer. In response thereto, the network node releases all active HARQ processes used by the UE to make them available to other UEs.

In the latter case with the inactivity timer comprised in the network node, the network node starts the inactivity timer when receiving scheduling information from the UE indicating that its data buffer is empty. The inactivity timer is stopped as soon as new scheduling information arrives from the UE indicating that it has data to send from its data buffer, which is effectively a resource request. If the inactivity timer expires without receiving scheduling information from the UE indicating presence of data in the UE's buffer, the network node initiates the release process by releasing the HARQ process(es) used by the first UE. In either of the above two examples of releasing the first part of the shared radio resource, the UE may send to the network node an existing parameter called "Total E-DCH Buffer Status", TEBS, which can be used to indicate absence of data in the UE's buffer by setting TEBS=0.

Figure 4:
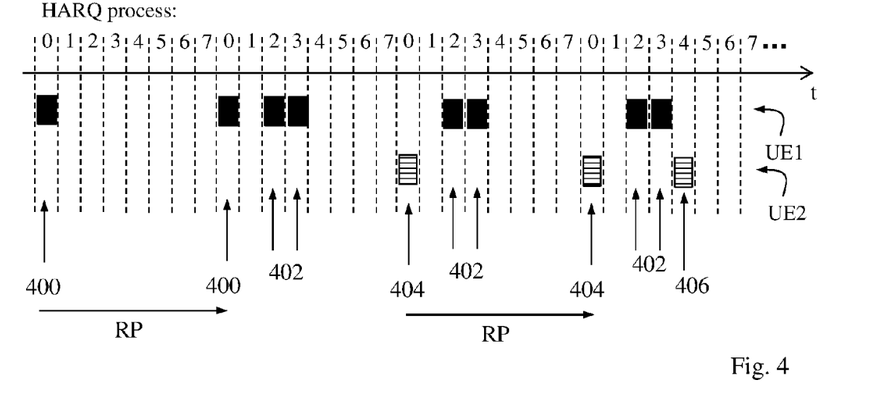
FIG. 4 is a diagram illustrating an example of how HARQ processes may be assigned to UEs, in accordance with some possible embodiments.

An example of how different HARQ processes may be used by a first UE and a second UE for transmitting uplink data in a cell on the same shared radio resource without colliding, will now be described with reference to the diagram in FIG. 4. As mentioned above, each HARQ process requires the UE to make its uplink transmissions in a HARQ-specific time interval determined by the respective HARQ process. This is illustrated as eight possible HARQ processes 0-7 which occur, one after the other, in a repeated sequence of time intervals along a timeline t. In the figure, black areas indicate time intervals allocated to the first UE and striped areas indicate time intervals allocated to the second UE. Further, "RP" denotes a collision resolution period when a default HARQ process 0 is used by the UEs initially that is before they get their respective UE-specific HARQ processes. The default HARQ process 0 may have been broadcasted as system information in the cell by a network node.

Firstly, the first UE initially uses the default HARQ process 0 in time intervals denoted 400 for transmitting data and its unique UE identifier during the collision resolution period RP, which allows the network node to assign and signal a first part of the shared radio resource to the first UE. In this example, the first part of the shared radio resource comprises the time intervals of two HARQ processes, namely 2 and 3. The first UE can therefore start transmitting data on the time intervals of 2 and 3 as shown by the black areas 402. Secondly, the second UE initially uses the default HARQ process 0 in time intervals denoted 404 for transmitting data and its unique UE identifier during the collision resolution period RP. The network node assigns and signals a second part of the shared radio resource to the second UE. In this example, the second part of the shared radio resource comprises the intervals of a single HARQ process 4 which is separate from the HARQ processes 2 and 3 used by the first UE. The second UE can therefore start transmitting data on the time interval of 4 as shown by the striped area 406.

As mentioned above, more than one HARQ process may be assigned to the same UE, e.g. to provide more bandwidth. A more detailed example of how a radio resource may be assigned in practice for a UE according to some possible embodiments, will now be described with reference to the signaling diagram in FIG. 5. It is assumed that the shared radio resource is the above-described common E-DCH resource. A first action 5:1 illustrates that the network node 500 broadcasts system information "SIB" which includes a signature "X" which identifies the shared radio resource. The system information may include further signatures, if used, that identify the shared radio resource. In a next action 5:2, the UE 502 reads the signatures in the system information SIB and decides to select the signature X for accessing the shared radio resource, e.g. based on other system information about the shared radio resource which was exemplified in A)-G) above. The broadcasted system information SIB also includes a default HARQ process that can initially be used, which would be 0 in the above example of FIG. 5.

Figure 5:
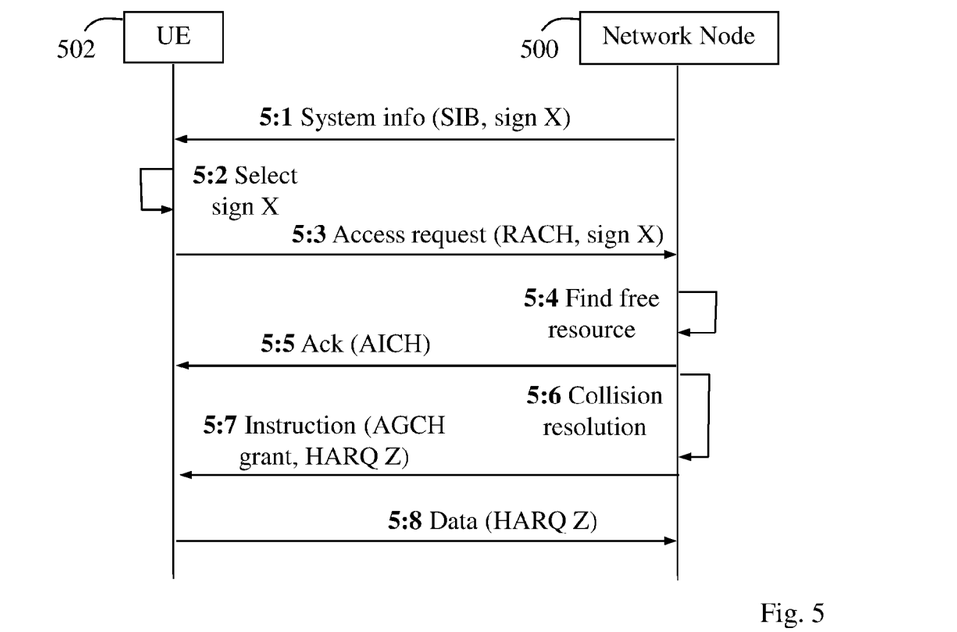
FIG. 5 is a signaling diagram illustrating an example of a procedure for assigning a radio resource to a UE, according to further possible embodiments.

The UE 502 accordingly sends a request for the shared radio resource in another action 5:3, in this case in the form of a RACH access request that includes the signature X. This request can thus be sent on a time interval of the default HARQ process.

In response thereto, the network node 500 finds a free part of the shared radio resource in action 5:4 and sends an acknowledgement on a channel called "Acquisition Indicator Channel", AICH, to the UE 502, in another action 5:5. The network node 500 also performs resolution of any collision during a collision resolution period, as described above, in a further action 5:6, and assigns the found free part of the shared radio resource to the UE. The network node 500 further sends an instruction in an AGCH grant message to the UE 502, in a next action 5:7, to apply a UE-specific HARQ process "Z" for transmitting on the assigned first part. Finally, the UE 502 is able to transmit data on the assigned first part by applying the HARQ process Z, as shown in an action 5:8.

Figure 6:
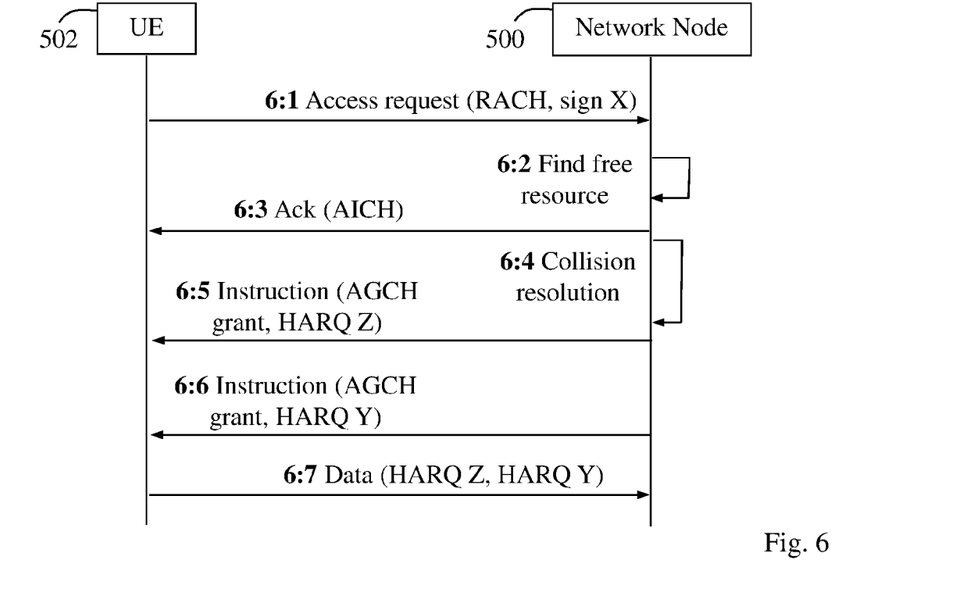
FIG. 6 is a signaling diagram illustrating another example of a procedure for assigning a radio resource to a UE, according to further possible embodiments.

FIG. 6 illustrates a similar example where the UE 502 is enabled to use two HARQ processes denoted "Z" and "Y" as follows. It is assumed that the UE 502 has read signature X from system information broadcasted by the network node 500, as of actions 5:1 and 5:2 above, and sends a resource request in the form of a RACH access request referring to signature X, in an action 6:1, basically corresponding to action 5:3 above. The network node 500 further finds a free part of the shared radio resource in action 6:2 and sends an acknowledgement on AICH to the UE 502 in action 6:3, basically in the manner described above for actions 5:4, 5:5. In this example, the free resource has greater bandwidth than the resource assigned in FIG. 5 in that the resource corresponds to two HARQ process Z and Y, instead of just one HARQ process Z in the above example.

After a collision resolution period of an action 6:4, similar to action 5:6 above, the network node 500 assigns the found free part of the shared radio resource and sends a first instruction in an AGCH grant message to the UE 502 in an action 6:5, to apply the UE-specific HARQ process Z for transmitting on the assigned first part. In addition, the network node 500 sends a second instruction in an AGCH grant message to the UE 502 in another action 6:6, to apply the UE-specific HARQ process Y for transmitting on the assigned first part. Thereby, the UE 502 is able to transmit data on the assigned first part by applying the HARQ processes Z and Y, as shown in a final action 6:7. Using two HARQ processes Z and Y in action 6:7 of FIG. 6 may basically enable twice the data throughput of using one HARQ process Z in action 5:8 of FIG. 5.

Figure 7:
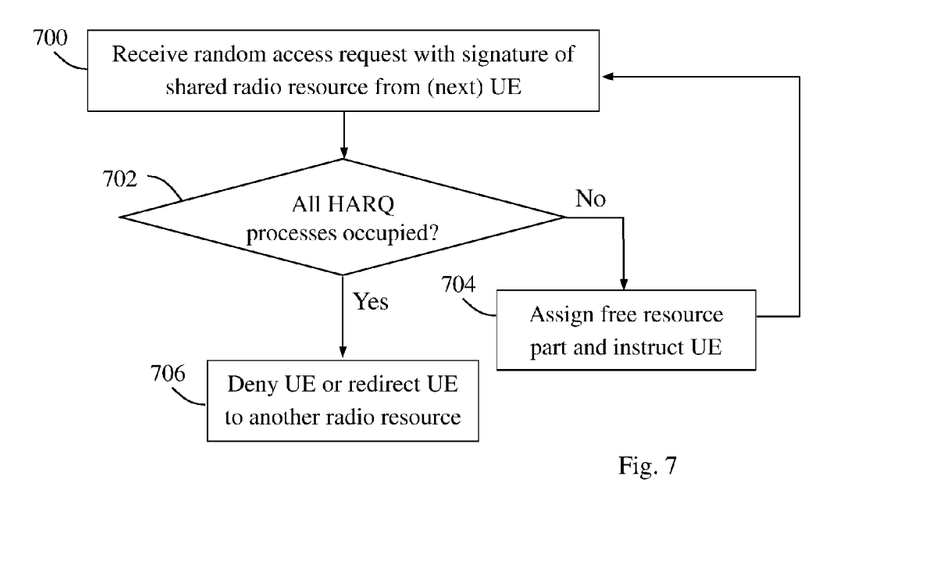
FIG. 7 is a flow chart illustrating a procedure in a network node, according to further possible embodiments.

Another example of a procedure performed by a network node when handling resource requests from multiple UEs, will now be described with reference to the flow chart in FIG. 7. The network node in this example may be the same as, or similar to, the network node described in any of the above examples. It is further assumed that there are a number of HARQ processes that can be applied by different UEs for transmitting simultaneously on the shared radio resource without collision, e.g. the eight HARQ processes 0-7 in the example of FIG. 4. A first action 700 illustrates that the network node receives a random access request from a UE, containing a signature identifying and pointing to a shared radio resource. The random access request is thus a request for using the shared radio resource for transmission of uplink data, as described in the previous sections.

The network node then determines, in an action 702, whether all HARQ processes of the shared radio resource are already occupied by other UEs in the cell. If not, a free part of the shared radio resource is assigned to the UE which is also instructed to apply a HARQ process corresponding to the assigned part, out of the total amount of HARQ processes of the shared radio resource, in an action 704. However, if there is no free HARQ process and corresponding unoccupied part of the shared radio resource left in action 702, the network node will either deny the UE access or redirect the UE to send a request for another radio resource, i.e. other than the shared one, in another action 706. In that case, the UE may be instructed to use another signature identifying that other radio resource. If the network can assign an unoccupied part of the shared radio resource to the UE and thus perform action 704, the process may return to action 700 and be repeated if a random access request is received from a next UE, and so forth.

Figure 8:
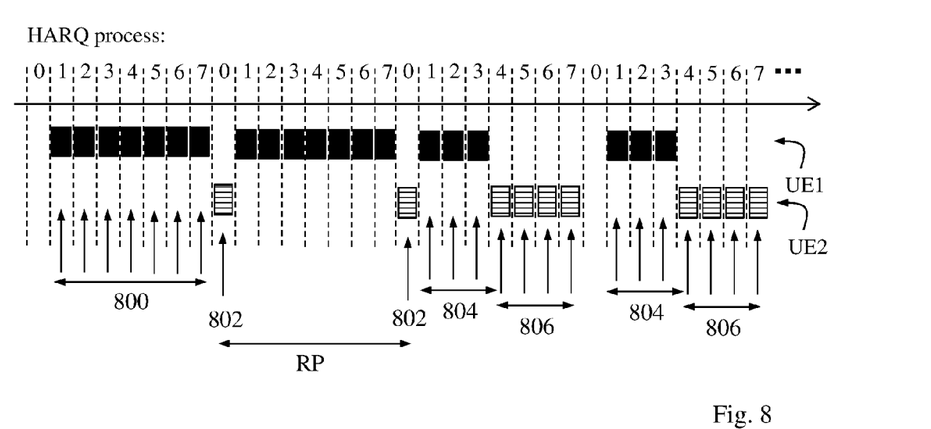
FIG. 8 is a diagram illustrating another example of how HARQ processes may be assigned to UEs, in accordance with some possible embodiments.

Another example of how different HARQ processes may be used by a first UE and a second UE for transmitting uplink data in a cell on the same shared radio resource without colliding, will now be described with reference to the diagram in FIG. 8 which is illustrated in a similar way as the diagram in FIG. 4. In the shown example, a set of HARQ processes has been assigned for exclusive use by a first UE, "UE1", in this case the HARQ processes 1-7 and a corresponding part of the shared radio resource, as indicated by the black areas at 800. It is assumed that the default HARQ process 0 always remains reserved for initial usage by UEs during a collision resolution period RP, e.g. for making a resource request, as explained for FIG. 4 above. It can be understood that this assignment of the radio resources of HARQ processes 1-7 may provide much higher throughput of data as compared to radio resources of a lesser number of HARQ processes. Basically, the data throughput, or bitrate that can be obtained, is proportional to the number of HARQ processes applied.

When a second UE, "UE2", makes a resource request by applying HARQ process 0, as indicated by the striped areas at 802, the network node instructs the first UE to release four HARQ processes of the set of UE-specific HARQ processes to make the released HARQ processes available to the second UE. Thus, HARQ processes 4-7 are released from the first UE and assigned to the second UE instead during its collision contention period RP. As a result, the first UE is allowed to continue transmitting on the shared radio resource by applying HARQ processes 1-3 at 804, and the second UE is allowed to transmit on the shared radio resource by applying HARQ processes 4-7 at 806.

Figure 9:
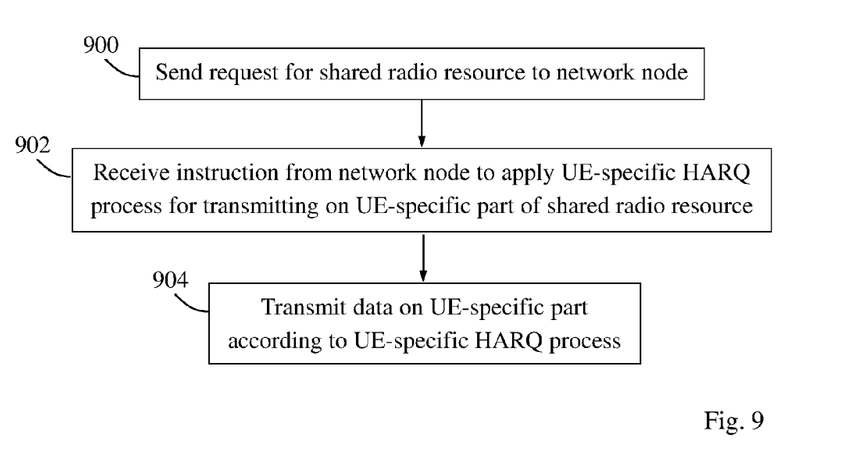
FIG. 9 is a flow chart illustrating a procedure in a UE, according to further possible embodiments.

A procedure with actions performed by a User Equipment, UE, for accessing a radio resource when present in a cell served by a network node of a network for wireless communication, will now be described with reference to the flow chart in FIG. 9. The UE in this procedure may, without limitation, be the first UE or the second UE in the above-described examples. In a first shown action 900, the UE sends a request for a shared radio resource to the network node. In a next action 902, the UE receives an instruction from the network node to apply a UE-specific HARQ process for transmitting on an assigned UE-specific part of the shared radio resource. This action basically corresponds to the above action 304 performed by the network node. The UE finally transmits data on the assigned UE-specific part according to the UE-specific HARQ process, in an action 904.

Figure 10:
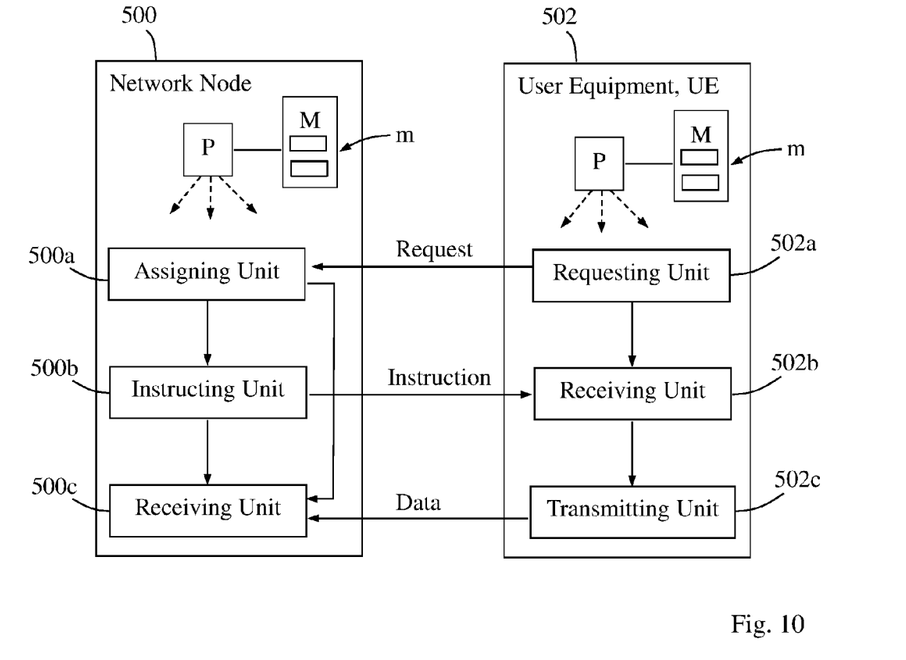
FIG. 10 is a block diagram illustrating a network node and a UE in more detail, according to further possible embodiments.

A detailed but non-limiting example of how a network node and a UE may be structured with some possible functional units to bring about the above-described operation of the network node and the UE, respectively, for enabling the UE to access a radio resource when present in a cell served by the network node, is illustrated by the block diagram in FIG. 10. To conform with at least some of the previous examples, the network node is denoted 500 and the UE is denoted 502. Again, the UE 502 may, without limitation, be any UE such as the first UE or the second UE mentioned in the above-described examples. The network node 500 and the UE 502 may be configured to operate according to any of the examples and embodiments described above and as follows. The network node 500 and the UE 502 will now be described in terms of some possible examples of employing the solution.

The network node 500 is configured to manage radio resources in a cell served by the network node. The network node comprises an assigning unit 500a adapted to assign a first part of a shared radio resource to a first UE, e.g. the UE 502, for uplink transmissions in the cell. The network node also comprises an instructing unit 500b adapted to instruct the first UE to apply a first HARQ process for transmitting on the assigned first part of the shared radio resource. The network node also comprises a receiving unit 500c adapted to receive data transmitted from the first UE based on the first HARQ process.

The units 500a-c are further capable of operating basically in a corresponding manner for any number of further UEs, as long as there are still unoccupied parts of the shared radio resource available for assignment, and the network node 500 is not limited in this respect. The assigning unit 500a is thus adapted to at least assign a second part of the shared radio resource to a second UE for uplink transmissions in the cell. The instructing unit 500b is adapted to instruct the second UE to apply a second HARQ process for transmitting on the assigned second part, and the receiving unit 500c is further adapted to receive data transmitted from the second UE based on the second HARQ process. Thereby, the network node 500 is able to, among other things, perform the process described for FIG. 3 above.

In a possible embodiment, the instructing unit 500b may be adapted to initially instruct the first UE to apply a set of UE-specific HARQ processes for transmitting, and may be further adapted to later re-instruct the first UE to release at least one of the set of UE-specific HARQ processes to make the released at least one HARQ process available to one or more other UEs in the cell. Some examples of this were described in more detail above, e.g. with reference to FIG. 8.

The UE 502 is configured to access a radio resource when present in a cell served by a network node 500 of a network for wireless communication. The UE 502 comprises a requesting unit 502a which is adapted to send a request for a shared radio resource to the network node 500. The UE 502 also comprises a receiving unit 502b which is adapted to receive an instruction from the network node 500 to apply a UE-specific HARQ process for transmitting on an assigned UE-specific part of the shared radio resource. The UE 502 further comprises a transmitting unit 502c adapted to transmit data on the assigned UE-specific part according to the UE-specific HARQ process. Thereby, the UE 502 is able to, among other things, perform the process described for FIG. 9 above.

In a possible embodiment, the requesting unit 502a may be adapted to include in the sent request a specific signature identifying the shared radio resource. This signature may have been read from system information broadcasted in the cell. If more than one signature identifies the shared radio resource, the UE may randomly select one of them. In another possible embodiment, the transmitting unit 502c may be adapted to initially apply a default HARQ process during a collision resolution period for transmitting data, which was described in more detail above.

It should be noted that FIG. 10 illustrates various functional units in the network node 500 and the UE 502 and the skilled person is able to implement these functional units in practice using suitable software and hardware. Thus, the solution is generally not limited to the shown structures of the network node 500 and the UE 502, and the functional units 500a-c and 502a-c may be configured to operate according to any of the features described in this disclosure, where appropriate.

The functional units 500a-c and 502a-c described above can be implemented in the network node 500 and the UE 502, respectively, by means of program modules of a respective computer program comprising code means which, when run by a processor "P" in each node causes the network node 500 and the UE 502 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 500 and the UE 502 in the form of a memory "M" having a computer readable medium and being connected to the processor P. The computer program product or memory M in each of the network node 500 and the UE 502 thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the network node 500 and the UE 502.

The above-described embodiments of this solution may be implemented in practice in several different ways and some examples will be briefly outlined below. In one example, the shared radio resource may be used by multiple UEs for transmitting data on a Dedicated Physical Control Channel, DPCCH, which channel is commonly used for transmitting uplink data related to power control and channel estimation. To limit the DPCCH overhead, it is possible to employ a Discontinuous Transmission, DTX, scheme which follows the HARQ processes applied by different UEs when transmitting on the shared radio resource. Thereby, a UE in DTX mode may keep its part of the shared radio resource for a considerably longer time. It would also be possible to define several DPCCHs per shared radio resource to allow identification of different UEs sharing the radio resource.

As mentioned above, more than one signature may be used each identifying a shared radio resource. In this case, a UE may read all these signatures in broadcasted system information and select one of them randomly for making a resource request, or random access request as described above. These signatures may further be combined with a scrambling code in a manner known as such.

In the examples illustrated in FIGS. 5 and 6, the network node 500 sends an instruction for applying a HARQ process on the absolute grant channel AGCH in actions 5:7 and 6:5, 6:6, respectively. This instruction may thus be an absolute grant message which is sent on a downlink frequency associated with the uplink frequency where the uplink transmission will be made according to the HARQ process. The absolute grant message allows a scheduler in the network node to directly adjust the granted rate of UEs under its control. The channel AGCH may also be used for collision resolution and release of common radio resources.

The AGCH, or E-AGCH, is a shared channel that uses an E-RNTI specific CRC in order to address messages to specific users. The absolute grant message itself includes multiple fields that are multiplexed together into 6 bits transmitted on the E-AGCH. These fields may include:

1) "Absolute Grant Value" which is used to determine a maximum E-DCH traffic to pilot ratio (E-DPDCH/DPCCH) that the UE is allowed to use in the next transmission. The length of the Absolute Grant Value field is 5 bits.
2) "Absolute Grant Scope" which indicates applicability of the Absolute Grant. It can take two different values, "Per HARQ process" or "All HARQ processes", indicating whether a HARQ process activation/de-activation will affect one HARQ process or all HARQ processes. The Absolute Grant Scope may be encoded in 1 bit.
3) Common E-DCH resource release (FDD only in CELL_FACH): An Absolute Grant with value set to 'INACTIVE' may be used by the network node to release parts of the shared radio resource, e.g. when the above-described inactivity timer expires.

When applying AGCH signaling for setup of a shared radio resource, the network node may indicate the grant allowed for a specific HARQ process. In case the UE is assigned several HARQ processes, the network node may need to transmit several AGCH signaling messages. Each message indicates the activation for a specific HARQ process, for example as shown in actions 6:5 and 6:6 in FIG. 6.

Some examples of how the solution may be used when Continuous Packet Connectivity, CPC, is applied, will now be described. In 3GPP Release 11, a UE that has access to a common E-DCH transmits DPCCH from receiving an assignment acknowledgement on the AICH until the E-DCH released, e.g. until expiry of the inactivity timer. In order to reduce a potentially large overhead from DPCCH signaling that could occur if all UEs on a shared E-DCH would transmit DPCCH continuously, a DTX scheme may be used as mentioned above. This scheme would follow the HARQ allocations so that a UE that is allowed to use a set of HARQ processes would only transmit DPCCH data during the time intervals of these HARQ processes.

To ensure retained synchronization and performance of the transmissions from multiple UEs, it may be useful to allow also "preambles", such that the UE is also allowed to use a time interval prior to its HARQ allocation for DPCCH transmission.

It may also be needed to limit the DTX scheme in case there are relatively long periods when the UE is not allocated any transmission intervals. This may be the case when the UEs transmission intervals are separated by several HARQ cycles, which is a possibility by assigning the same part, i.e. HARQ process, to more than one UE. The UEs will then take turns to transmit on the corresponding time interval in different HARQ cycles.

When CPC is enabled, DPCCH transmissions from a specific UE can be identified based on the timing of the transmissions which is controlled by the UE's assigned HARQ process. Then, the network is able to identify DPCCH messages between UEs who are using the same shared radio resource based on the transmission timing. If the DPCCH transmissions from different UEs are overlapping, it would not be possible to separate the UEs.

To enable the network to identify a DPCCH transmission from a specific UE, even when the UEs are continuously transmitting DPCCH, it is possible to configure several DPCCHs by defining different scrambling or spreading codes for these. For example, one scrambling or spreading code could be defined per HARQ process which would allow the network to distinguish the DPCCHs from different UEs from one another. This may also enhance the process of channel estimation. It would also be possible to indicate to the UE which DPCCH scrambling or spreading code to use, in case it is not tied to the used HARQ process. Using several DPCCHs simultaneously might somewhat increase the control channel overhead but this may be compensated by the gains from improved performance of the channel estimation. Using several DPCCHs could also be combined with CPC, perhaps using less aggressive CPC settings to balance overhead and channel estimation performance.

Although the previous examples refer to the control channel of DPCCH, they may be applicable for other control channels as well, for example any of the control channels denoted E-HICH, E-RGCH, E-AGCH, HS-DPCCH and F-DPCH.

While the solution has been described with reference to specific exemplary embodiments, the description is generally only intended to illustrate the inventive concept and should not be taken as limiting the scope of the solution. For example, the terms "user equipment", "network node", "radio resource", "resource request", "HARQ process" and "signature" have been used throughout this description, although any other corresponding entities, functions, and/or parameters could also be used having the features and characteristics described herein. The solution is defined by the appended claims.

The invention claimed is:
1. A method in a network node of a network for wireless communication for managing radio resources in a cell served by the network node, the method comprising:
assigning a first part of a shared radio resource to a first User Equipment, UE, for uplink transmissions in the cell;

instructing the first UE to apply a first UE-specific Hybrid Automatic Repeat Request, HARQ, process for transmitting on the assigned first part;

receiving data transmitted from the first UE on the assigned first part based on the first HARQ process;

assigning a second part of the shared radio resource to a second UE for uplink transmissions in the cell such that the first UE and the second UE are assigned different parts of the shared radio resource for simultaneous use of the shared radio resource by the first UE and the second UE;

instructing the second UE to apply a second UE-specific HARQ process for transmitting on the assigned second part, where the second HARQ process is different from the first HARQ process; and receiving data transmitted from the second UE on the assigned second part based on the second HARQ process.

2. The method according to claim 1, wherein the first and second UEs are in a CELL_FACH state and the shared radio resource is a common Enhanced Dedicated Channel, E-DCH, resource.

3. The method according to claim 1, wherein the shared radio resource is identified by a specific signature that is included in a resource request received from each of the first and second UEs when the first and second UEs request for a radio resource.

4. The method according to claim 3, wherein the specific signature has been assigned to the shared radio resource and is included in system information signalled in the cell.

5. The method according to claim 4, wherein the system information further includes at least one of: a maximum number of UEs supported by the shared radio resource, a length of an inactivity timer determining when an assigned part of the shared radio resource will be released after a last data transmission, UE capabilities required for using the shared radio resource, potential throughput of data that can be achieved by using the shared radio resource, a default HARQ process to be applied initially during a collision resolution period, a maximum allowed time span of using the shared radio resource, and a maximum amount of data allowed for transmission on the shared radio resource.

6. The method according to claim 1, wherein the first UE is initially instructed to apply a set of UE-specific HARQ processes for transmitting, and the first UE is later re-instructed to release at least one of the set of UE-specific HARQ processes to make the released at least one HARQ process available to one or more other UEs in the cell.

7. The method according to claim 1, wherein the method is performed when a current traffic load in the cell exceeds a threshold or when the number of available signatures is below a limit.

8. The method according to claim 1, wherein the assigned first part of the shared radio resource is released after an inactivity timer has expired indicating a timeout of empty data buffer in the first UE.

9. A network node of a network for wireless communication, the network node being configured to manage radio resources in a cell served by the network node, the network node comprising:

an assigning unit adapted to assign a first part of a shared radio resource to a first User Equipment, UE, for uplink transmissions in the cell;

an instructing unit adapted to instruct the first UE to apply a first Hybrid Automatic Repeat Request, HARQ, process for transmitting on the assigned first part; and a receiving unit adapted to receive data transmitted from the first UE based on the first HARQ process, wherein the assigning unit is further adapted to assign a second part of the shared radio resource to a second UE for uplink transmissions in the cell such that the first UE and the second UE are assigned different parts of the shared radio resource for simultaneous use of the shared radio resource by the first UE and the second UE;

the instructing unit is further adapted to instruct the second UE to apply a second HARQ process for transmitting on the assigned second part where the second HARQ process is different from the first HARQ process; and the receiving unit is further adapted to receive data transmitted from the second UE based on the second HARQ process.

10. The network node according to claim 9, wherein the shared radio resource is a common Enhanced Dedicated Channel, E-DCH, resource.

11. The network node according to claim 9, wherein the shared radio resource is identified by a specific signature that is included in a resource request received from each of the first and second UEs when the first and second UEs request for a radio resource.

12. The network node according to claim 11, wherein the specific signature has been assigned to the shared radio resource and is included in system information signalled in the cell.

13. The network node according to claim 12, wherein the system information further includes at least one of: a maximum number of UEs supported by the shared radio resource, a length of an inactivity timer determining when an assigned part of the shared radio resource will be released after a last data transmission, UE capabilities required for using the shared radio resource, potential throughput of data that can be achieved by using the shared radio resource, a default HARQ process to be applied initially during a collision resolution period, a maximum allowed time span of using the shared radio resource, and a maximum amount of data allowed for transmission on the shared radio resource.

14. The network node according to claim 9, wherein the instructing unit is adapted to initially instruct the first UE to apply a set of UE-specific HARQ processes for transmitting, and further adapted to later re-instruct the first UE to release at least one of the set of UE-specific HARQ processes to make the released at least one HARQ process available to one or more other UEs in the cell.

15. The network node according to claim 9, wherein the network node is configured to operate when a current traffic load in the cell exceeds a threshold or when the number of available signatures is below a limit.

16. The network node according to claim 9, wherein the assigned first part of the shared radio resource is released after an inactivity timer has expired indicating a timeout of empty data buffer in the first UE.

17. A method in a User Equipment, UE, for accessing a radio resource when the UE is present in a cell served by a network node of a network for wireless communication, the method comprising:

sending a request for a shared radio resource to the network node;

receiving an instruction from the network node to apply a UE-specific Hybrid Automatic Repeat Request, HARQ, process for transmitting on an assigned UE-specific part of the shared radio resource, wherein the HARQ process is exclusive to the UE; and transmitting data on the assigned UE-specific part according to the UE-specific HARQ process while another UE simultaneously uses a different part of the shared radio resource.

18. The method according to claim 17, wherein the sent request includes a specific signature identifying the shared radio resource.

19. The method according to claim 17, wherein the UE initially applies a default HARQ process during a collision resolution period for transmitting data.

20. A User Equipment, UE, configured to access a radio resource when the UE is present in a cell served by a network node of a network for wireless communication, the UE comprising:
- a requesting unit adapted to send a request for a shared radio resource to the network node;
- a receiving unit adapted to receive an instruction from the network node to apply a UE-specific Hybrid Automatic Repeat Request, HARQ, process for transmitting on an assigned UE-specific part of the shared radio resource, wherein the HARQ process is exclusive to the UE; and
- a transmitting unit adapted to transmit data on the assigned UE-specific part according to the UE-specific HARQ process while another UE simultaneously uses a different part of the shared radio resource.

21. The UE according to claim 20, wherein the requesting unit is adapted to include in the sent request a specific signature identifying the shared radio resource.

22. The UE according to claim 20, wherein the transmitting unit is adapted to initially apply a default HARQ process during a collision resolution period for transmitting data.

* * * * *